(12) United States Patent
Haas

(10) Patent No.: US 7,092,158 B2
(45) Date of Patent: Aug. 15, 2006

(54) BACK-PROJECTION SCREEN

(75) Inventor: Günther Haas, Saint Grégoire (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/480,684

(22) PCT Filed: Jun. 4, 2002

(86) PCT No.: PCT/FR02/01871

§ 371 (c)(1),
(2), (4) Date: Dec. 12, 2003

(87) PCT Pub. No.: WO02/101460

PCT Pub. Date: Dec. 19, 2002

(65) Prior Publication Data

US 2004/0165260 A1    Aug. 26, 2004

(30) Foreign Application Priority Data

Jun. 13, 2001    (FR) .................................. 01 07708

(51) Int. Cl.
*G03B 21/60* (2006.01)
(52) U.S. Cl. ..................... 359/460; 359/453; 359/456
(58) Field of Classification Search ................ 359/448, 359/449, 452, 453, 455–457, 460, 454; 353/74, 353/77, 78, 79, 98; 348/786–789, 760, 794; G03B 21/60
See application file for complete search history.

(56) References Cited

U.S. PATENT DOCUMENTS

| | | | |
|---|---|---|---|
| 3,791,712 A | 2/1974 | Miyagi | 350/128 |
| 4,003,080 A | 1/1977 | Maiman et al. | 358/208 |
| 4,512,631 A | 4/1985 | VanBreemen | 350/128 |
| 4,531,812 A | 7/1985 | Oguino | 350/128 |
| 4,674,836 A * | 6/1987 | Yata et al. | 359/457 |
| 4,729,631 A * | 3/1988 | Takahashi et al. | 359/456 |
| 6,020,937 A | 2/2000 | Bardmesser | 348/756 |
| 6,304,379 B1 | 10/2001 | Kobayashi | 359/457 |
| 6,389,206 B1 * | 5/2002 | Veligdan | 385/120 |
| 6,597,417 B1 * | 7/2003 | Veligdan | 349/95 |

FOREIGN PATENT DOCUMENTS

EP    1039337    9/2000

* cited by examiner

*Primary Examiner*—W. B. Perkey
*Assistant Examiner*—Andrew Sever
(74) *Attorney, Agent, or Firm*—Joseph J. Laks; Harvey D. Fried; Patricia A. Verlangieri

(57) ABSTRACT

The invention concerns a screen wherein elements distributed on a single and common diopter enable both collimating and micro-focusing by relecting the light beams projected on said screen; on said diopter can also be distributed elements acting by refraction. The inventive screen has only one main optical component, hence it is not expensive to produce. The invention is particularly applicable to very compact projection devices and to situations with high projection incidence angles.

8 Claims, 5 Drawing Sheets

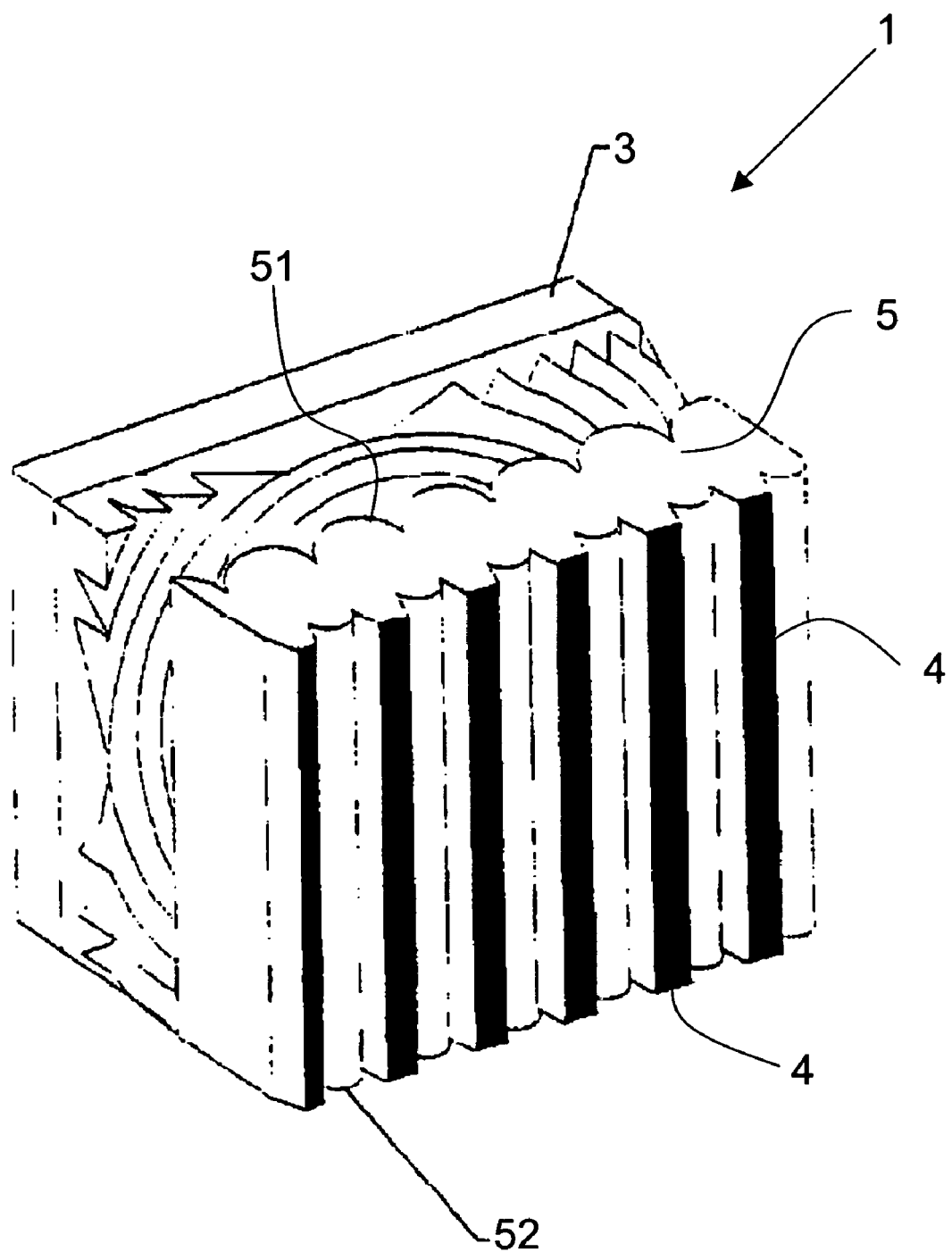
Fig.2 – PRIOR ART

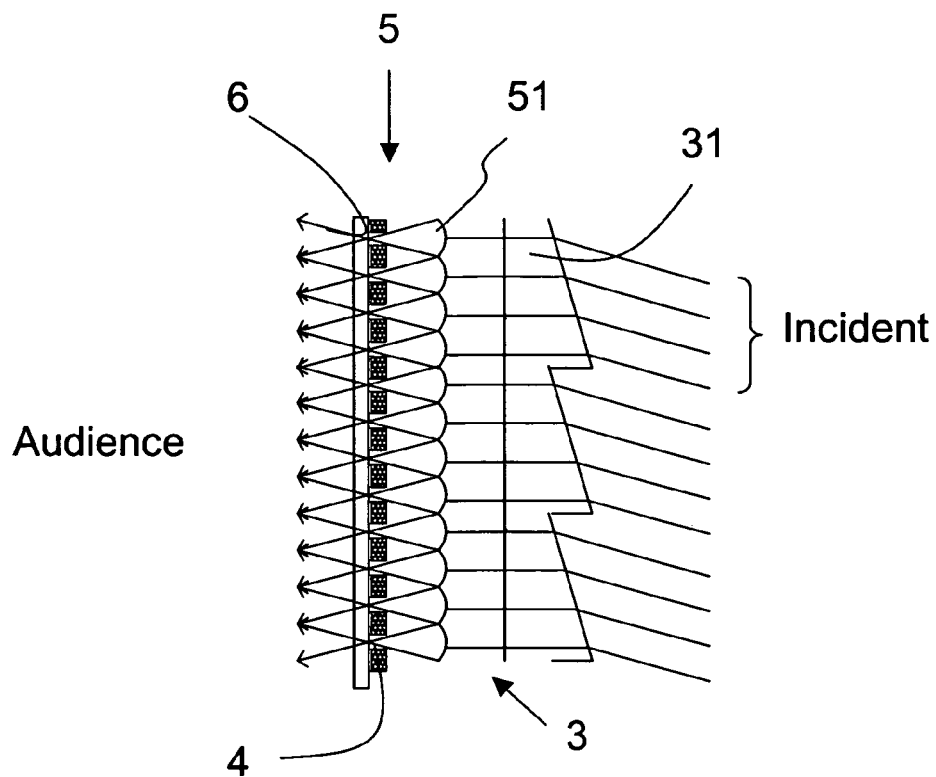
Fig.3 – PRIOR ART
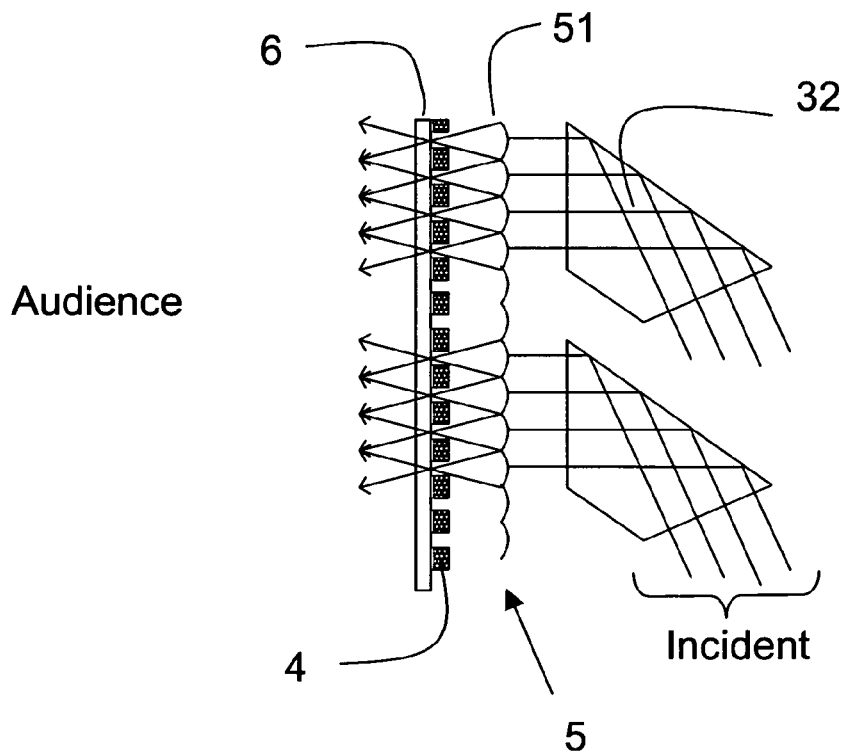
Fig.5 – PRIOR ART

BACK-PROJECTION SCREEN

This application claims the benefit, under 35 U.S.C. § 365 of International Application PCT/FR02/01871, filed Jun. 4, 2002, which was published in accordance with PCT Article 21(2) on Dec. 19, 2002 in French and which claims the benefit of French patent application No. 0107708, filed Jun. 13, 2001.

The invention relates to image backprojection screens of the type that are used in television backprojectors.

FIG. 1 shows a system for displaying images on a backprojection screen 1, said system comprising, apart from the screen itself, at least one image source (not shown) and optical means for generating the image of this source on the screen through at least one objective 2; document U.S. Pat. No. 3,791,712 discloses a system of this type.

The image source may, for example, be formed by the front face of a cathode-ray tube or by a matrix of electrooptic valves that are formed, for example, from liquid-crystal cells, this matrix then being combined with a light source.

In the case of a laser projector, the system for displaying images on a projection screen comprises a source of laser rays, means for modulating the emission intensity of this source, and means for complete scanning of the modulated ray coming from this source over the surface of the screen; the scanning means may be based on rotating mirrors as described in document U.S. Pat. No. 6,020,937.

Each pixel of the image formed on the screen therefore corresponds, for example, to one element of the matrix of liquid-crystal cells or to the impact of the laser ray at the moment of scanning and of modulation.

To obtain image display systems that are more compact, it is general practice to place mirrors in the optical path between the screen and the objective 2 or the laser source; FIG. 1 of document U.S. Pat. No. 4,512,631 describes such a compact system; according to other variants, these mirrors may be replaced with holographic components having the same function.

Finally, to display color images, these systems may comprise as many image sources as primary colors, these being placed so as to superpose images of different primary colors on the same screen 1.

FIG. 2 shows the image backprojection screen 1, which comprises, the rear, means for macro-collimating the rays coming from the objective 2 or from a laser source and, at the front, means for enhancing the display contrast in ambient light.

The term "macro-collimation means" means optical means suitable for directing the rays coming from the objective 2 or from a laser source approximately in the same direction perpendicular to the plane of the screen; thus, when the optical axis of the envelope of the rays incident on the screen is perpendicular to this screen (zero angle of incidence), these means are generally formed by a Fresnel lens 3.

The means for enhancing contrasts are generally formed by a matrix of black bands 4, as shown in FIG. 2.

It is general practice to place, between the Fresnel lens 3 and this matrix of black bands 4, means for microfocusing the parallel rays coming from this lens 3, these being suitable both for making the major portion of the light flux pass between the black bands 4 and for directing the light toward the aid capable of observing the images to be displayed; this provision makes it possible, in combination with the black bands, to enhance the contrast while minimizing the emissive surface area of the screen, and provides a light-scattering function; these microfocusing means are generally formed by a lenticular sheet 5, as shown in FIG. 2, comprising in this case both microlenses 51 on the rear face and microlenses 52 on the front face, these being placed between the bands 4 of the black matrix.

FIG. 3 shows schematically a partial cross section through the screen of FIG. 2; the incident rays coming from an objective or from a laser source (these not being shown) are deflected by refraction through each prismatic element 31 of the Fresnel lens 3 into a beam of parallel rays all orthogonal to the screen; each microlens 51 of the lenticular sheet 5 then makes the parallel rays that it receives between the bands 4 of the black matrix converge.

If the angle of incidence on the screen 1 of the rays coming from the objective 2 or from the laser source is very high, that is to say very far from the normal to the screen as shown in FIG. 4, the macro-collimation means may be formed by prismatic elements operating by reflection, as described in document U.S. Pat. No. 4,003,080 (see especially FIGS. 3 and 4 of that document); FIG. 5 appended here is a partial cross section through the screen 1 provided with such macro-collimation means formed from prismatic elements 32 operating by total reflection or by reflection off a metal surface.

Whatever the configuration, the backprojection screens therefore comprise, on the one hand, macro-collimation means 2 generally formed from prismatic elements 31; 32 and, on the other hand, microfocusing means 5 generally formed from microlenses 51, 52.

Such screens are therefore expensive to produce, not only because they comprise two separate optical components, to be manufactured separately, for example a Fresnel lens on the one hand and a lenticular sheet on the other, but also because these two separate elements must be accurately assembled and aligned; such multiple manufacturing and assembly steps are economically penalizing.

The object of the invention is to remedy this drawback.

For this purpose, the subject of the invention is a back-projection screen to be placed in the field of an envelope of projection light rays, characterized in that it comprises elements distributed over one and the same diopter that makes it possible both to macro-collimate and microfocus said rays by reflection.

Since the same elements allow both macro-collimation and microfocussing, instead of using, as in the prior art, on the one hand a Fresnel lens for macro-collimation and on the other hand a lenticular sheet for microfocussing, only a single optical component is used to carry out the two functions at the same time, which represents a significant economic advantage.

Since a single diopter is used, the same surface fulfils the functions previously provided by two separate optical components; since all the optical elements of the screen relating to the macro-collimation and microfocussing functions are distributed over the same surface according to the invention, the screen according to the invention may be produced by conventional methods, such as those used to manufacture Fresnel lenses or lenticular sheets, such as for example injection molding or compression molding; the screens according to the invention are therefore particularly inexpensive to manufacture.

Like the elements distributed over one and the same diopter operating by reflection, the screen according to the invention is particularly well suited to very oblique angles of projection incidence and makes it possible to obtain a very compact projection device, even without using mirrors; thus, the angle of incidence of the optical axis of the envelope of the incident rays with the plane of the screen may be easily greater than or equal to 70° C.

Preferably, said reflection is a total reflection, as opposed to specular reflection of a metal surface.

According to a variant of the invention, aside from the optical elements already mentioned relating to the macro-collimation and microfocussing functions, said diopter includes elements that contribute to the collimation and/or focussing function by refraction.

Preferably, this diopter corresponds to the rear face of a main optical component of said screen.

The screen according to the invention can be used in any backprojection image display system, especially in systems comprising at least one laser source.

The invention will be more clearly understood on reading the description that follows, given by way of non-limiting example, and with reference to the appended drawings in which:

FIG. 2 is a perspective view of a screen according to the prior art of the device of FIG. 1;

FIG. 3 is a partial schematic cross section of the screen of FIG. 2;

FIG. 5 is a partial schematic cross section of a screen according to the prior art of the device of FIG. 4;

To simplify the description and bring out the differences and advantages of the present invention over the prior art technique, identical references will be used for elements that provide the same functions.

The incident rays in the field of which the screen according to the invention is placed come, for example, from a projection objective or from a laser source (these not being shown).

Figure 1:
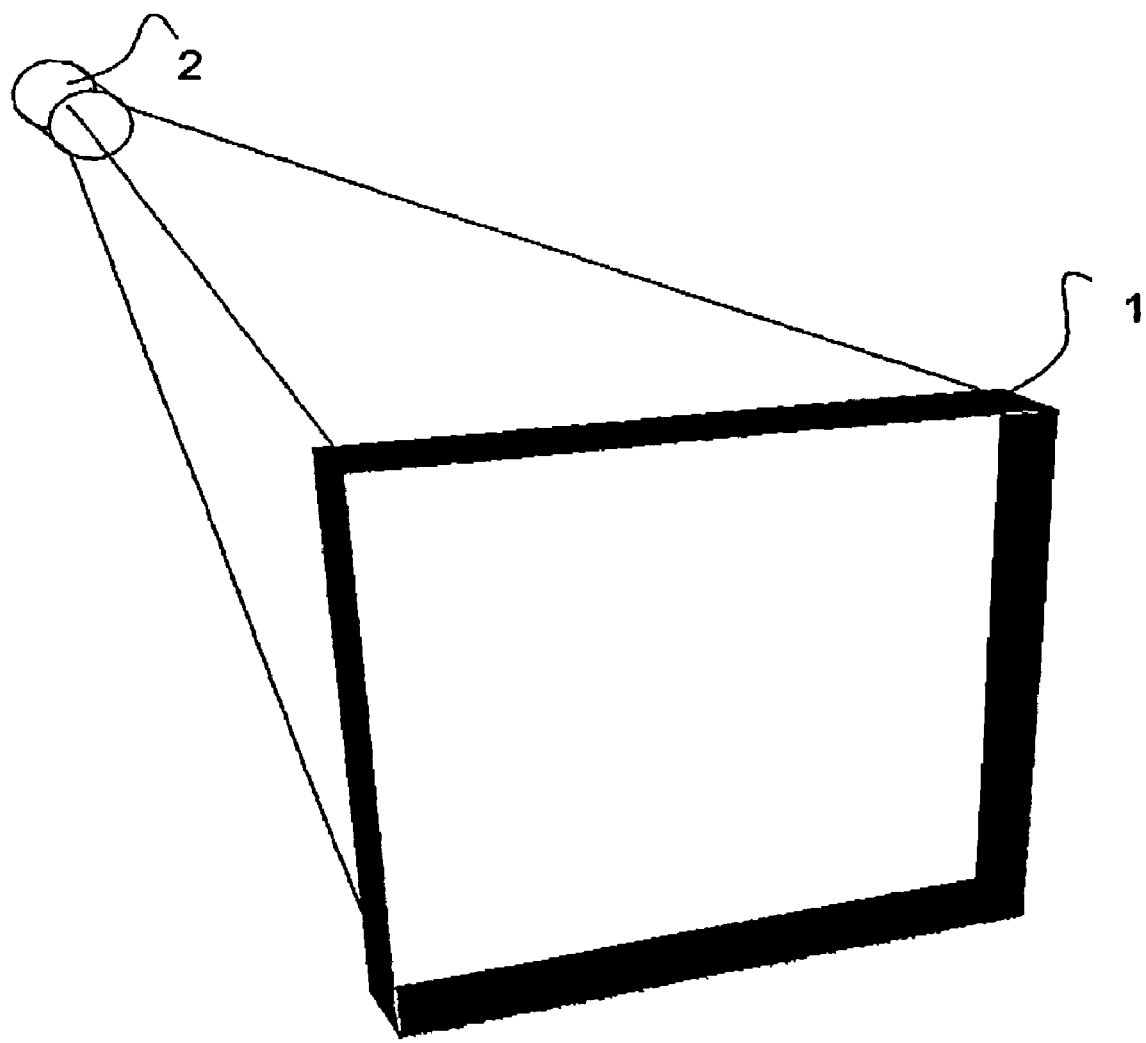
FIGS. 1 and 4 are simplified diagrams of backprojection display devices.
Figure 4:
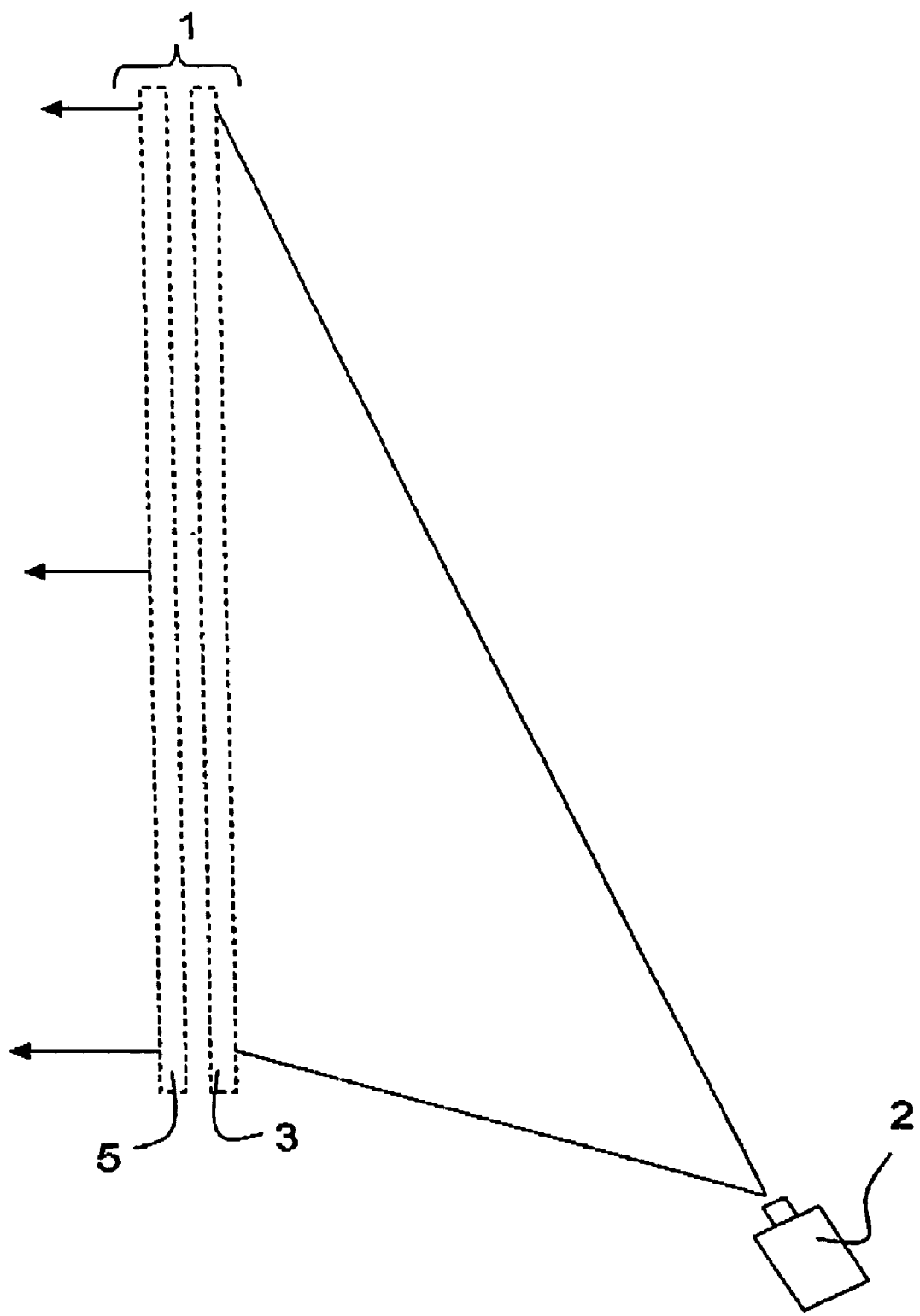
Figure 6:
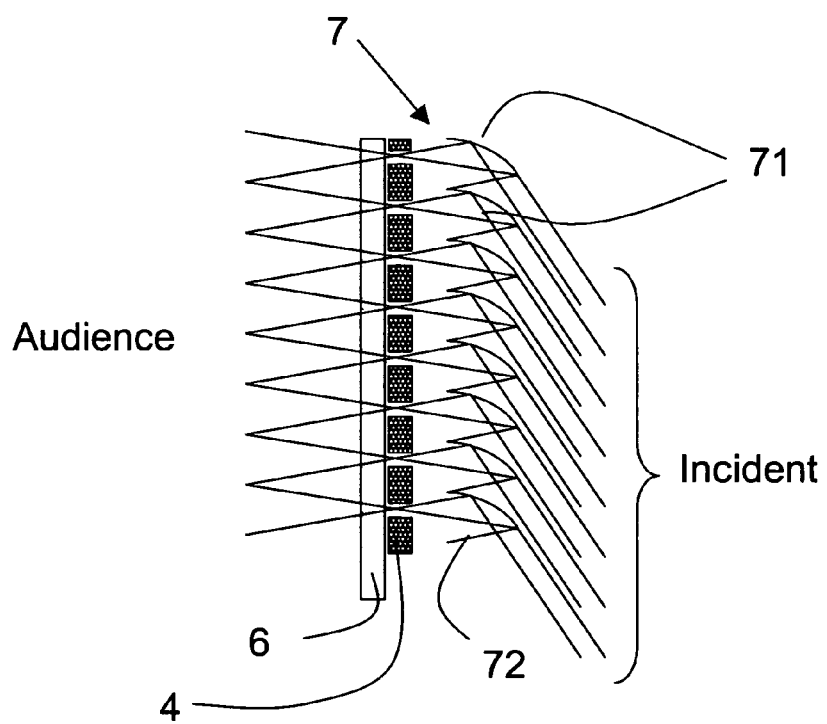
FIG. 6 is a partial schematic layer of a screen according to one embodiment of the invention.

Referring to FIG. 6, which shows a partial cross section of one embodiment of the screen according to the invention, having here on its front face a matrix of black contrast bands 4, a succession of diopter elements 71 distributed over one and the same surface or diopter orients, by reflection, the rays of the incident beam (or envelope of the rays) in a direction that is generally centered about the normal to the screen and focuses portions of this beam so as to make the rays pass between the bands 4 of the black matrix of the screen and to orient them toward the aid capable of observing the images displayed on the screen; thus, placed opposite each gap between the black bands 4 is a diopter element 71 which fulfils, at least partly, the two functions of collimation and focussing simultaneously; as shown in FIG. 6, to macro-collimate and microfocus the entire incident beam, a succession of diopter elements 71 is placed side by side, these being joined by other surface elements 72, in such a way that the set of elements 71, 72 forms the rear surface of the screen according to the invention; the surface elements 72 here are flat and oriented orthogonally to the direction of the incident rays, so as not to deflect the direction of propagation of these rays; thus, the backprojection screen is formed only from a single main optical component 7, the rear face of which corresponds to a single diopter that combines the elements 71, 72 and the front face of which bears here the matrix of black bands 4; according to a variant of the invention, this main optical component 7 may include lenticular elements between the black bands, similar to the elements 52 in FIG. 2.

The optical component 7 of the screen according to the invention may be produced by conventional methods, such as those used to manufacture Fresnel lenses or lenticular sheets, such as for example injection molding or compression molding; the screens according to the invention are therefore particularly inexpensive to manufacture, since the functions previously provided by two separate components, to be manufactured separately and then assembled, are now provided by a single component.

As shown in FIG. 6, since the diopter elements 71 act by reflection, the angle of incidence of the light rays in the field of which the screen is placed is very high, that is to say very far from the normal to the screen.

According to a variant of the invention that is not described here in detail, the surface elements 72 also participate in the collimation and/or focussing function by refraction; for example, these elements, again planar, are no longer placed orthogonally to the direction of the incident rays; for example, these elements are no longer planar and have a shape suitable for participating in the collimation and/or focussing function; according to this variant, the diopter formed by the rear face of the main optical component 7 of the screen 1 then acts by refraction at the surface elements 72 and by reflection at the surface elements 71.

Advantageously, the diopter formed by the rear face of the main optical component 7 of the screen 1 completely fulfils the collimation and focussing functions simultaneously.

It may therefore be seen that the screen according to the invention is particularly well suited to the cases in which the angle of incidence of the optical axis of the envelope of the rays projected onto the plane of the screen is greater than or equal to 70°.

Figure 7:
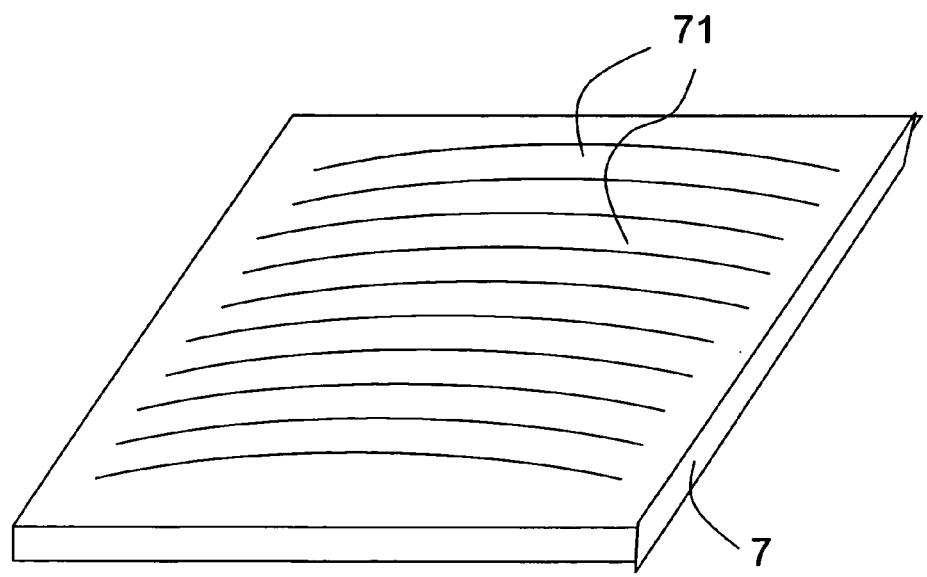
FIG. 7 is a rear perspective view of the main optical component 7 of the screen of FIG. 6.

FIG. 7 shows schematically the arrangement in the form of circular arcs of the diopter elements 71, this arrangement being suitable for the angle of incidence of the rays striking the same diopter element to be constant over the entire width of the screen; such an arrangement is also described in FIG. 7 of the document U.S. Pat. No. 4,674,836 in the case of conventional screens; preferably, the black bands on the other face of the optical component 7 have the same circularly arcuate shape so as to be placed between each diopter element over the entire width of the screen.

The screen according to the invention may advantageously be used in any backprojection image display system, especially very compact systems; it may in particular be used in laser projectors.

The invention claimed is:

1. A backprojection screen to be placed in the field of an envelope of projection light rays, comprising:
    elements distributed over one and the same diopter that makes it possible both to macro-collimate and micro-focus said rays by reflection, and
    a matrix of black contrast bands,
    said micro-collimation being adapted for directing said light rays in a direction which is perpendicular to the plane of the backprojection screen, and
    said microfocusing being adapted for allowing a portion of the light flux for said directed light rays to pass between said black bands.

2. The screen as claimed in claim 1, wherein said elements are distributed as circular arcs.

3. The screen as claimed in claim 1, wherein said reflection is a total reflection.

4. The screen as claimed in claim 1, wherein said diopter furthermore includes elements that collimate and/or focus by refraction.

5. The screen as claimed in claim 1, wherein said diopter corresponds to the rear face of said screen.

6. A backprojection image display system including a screen as claimed in claim 1, and further comprising at least one image source and optical means for generating the image of this source on the screen through at least one objective that generates said envelope of projection light rays.

7. The image display system as claimed in claim 6, wherein the angel of incidence of the optical axis of said envelope in the plane of the screen is greater than or equal to 70°.

8. The image display system as claimed in claim 6 wherein the angle of incidence of the rays striking the same diopter element is constant over the entire width of said screen.

* * * * *